(12) United States Patent
Murg

(10) Patent No.: US 6,484,605 B1
(45) Date of Patent: Nov. 26, 2002

(54) CONTROL CABLES

(75) Inventor: Larry J. Murg, Solon, OH (US)

(73) Assignee: Transdigm, Inc, Richmond Hts., OH (US)

( * ) Notice: Subject to any disclaimer, the term of this patent is extended or adjusted under 35 U.S.C. 154(b) by 0 days.

(21) Appl. No.: 09/133,566

(22) Filed: Aug. 13, 1998

(51) Int. Cl.$^7$ ................................................. F16C 1/20
(52) U.S. Cl. ................................. 74/502.5; 74/501.5 R
(58) Field of Search ............................ 74/502.5, 501.6, 74/502, 502.2, 502.3, 501.5 R, 502.4, 502.6

(56) References Cited

U.S. PATENT DOCUMENTS

| | | |
|---|---|---|
| 2,325,671 A | 8/1943 | Gerry |
| 3,525,996 A | 8/1970 | Moore |
| 3,994,185 A * | 11/1976 | Gilardi ...................... 74/502.5 |
| 4,238,974 A * | 12/1980 | Fawcett ...................... 74/502.5 |
| 4,406,177 A | 9/1983 | Bennett et al. |
| 4,892,005 A | 1/1990 | Nagano |

OTHER PUBLICATIONS

Cablecraft—Quality Aircraft Control Cables brochure Dated May 1997.

* cited by examiner

Primary Examiner—Mary Ann Green
(74) Attorney, Agent, or Firm—Calfee Halter & Griswold LLP

(57) ABSTRACT

Reciprocating or push-pull control cable assemblies have fittings permanently attached, preferable by swaging or other mechanical deformation process, to the ends of a control cable or core that reciprocates within an outer casing. The fittings have a projected width no greater than the inner diameter of the casing. As a result, the entire control cable, with fittings attached, can be pulled through the casing to remove the control cable for inspection, maintenance or replacement. The cable also have a unique combination of ball joint assemblies and excluder seals that effectively exclude contaminants from the interior of the casing.

2 Claims, 2 Drawing Sheets

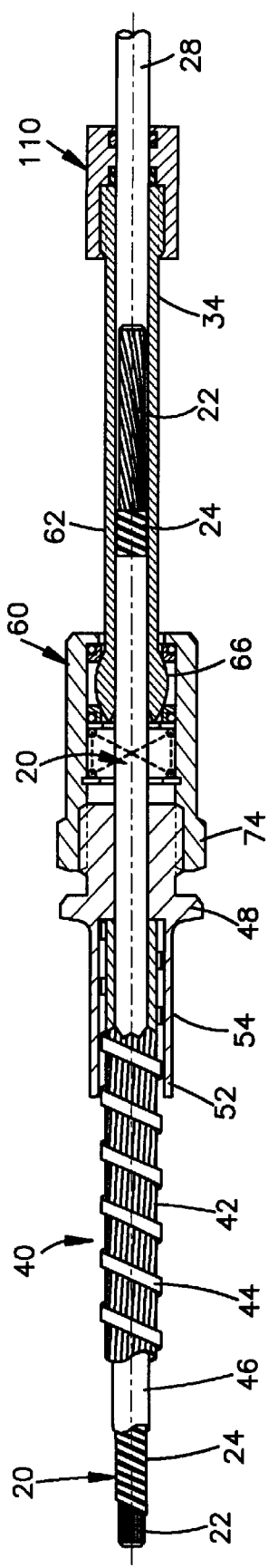
Fig.2
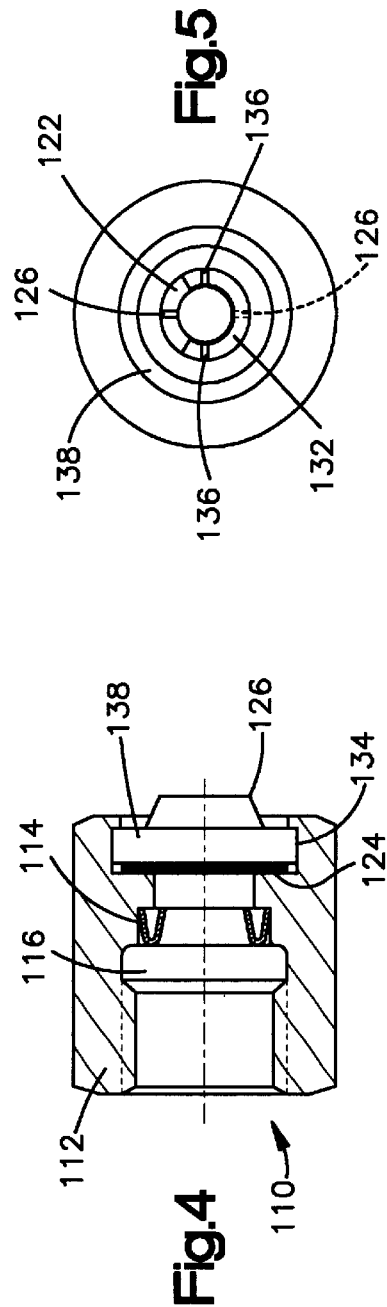
Fig.5
Fig.4
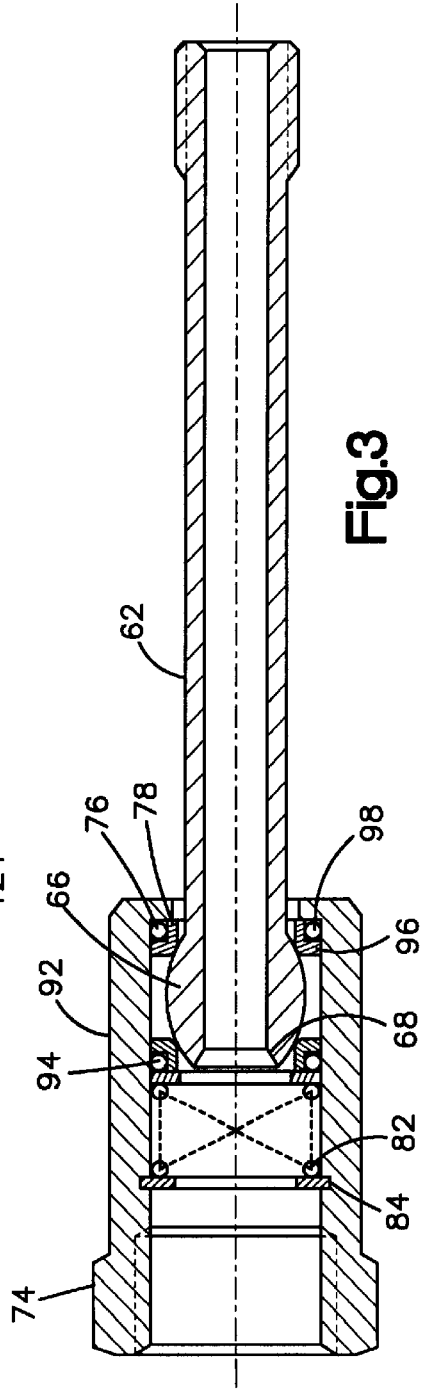
Fig.3

CONTROL CABLES

FIELD OF THE INVENTION

This invention relates to mechanical control assemblies, and more particularly to push-pull or reciprocating cable assemblies suitable for aeronautical applications.

BACKGROUND

Push-pull control cable assemblies are used for many systems, e.g. aircraft engines, which must be adjusted from a distance or which are located in hostile environments. These controls frequently have a cable that reciprocates within a casing that supports and protects the cable. Fittings are typically attached to both ends of the cable to connect it to a system to be controlled at one end, and to operating levers, pedals and the like at the other end.

With existing controls of this type, the entire control cable assembly must be removed for repair or replacement, and the cable itself cannot be thoroughly inspected without removal of fittings permanently attached to each end. When these cables fail, they are normally discarded and replaced. To facilitate inspection, repair and replacement, a control assembly with a reciprocating cable that can be removed from the casing without removing or disassembling the casing would be desirable.

SUMMARY OF THE INVENTION

This invention provides improved control cable assemblies having control cables mounted within and adapted for reciprocation within an outer casing. A fitting is permanently attached, preferable by swaging or other mechanical deformation process, to at least one end, normally both ends, of the control cable. These fittings have a projected width, i.e. the width in a plane at right angles to the axis of the cable, no greater than the inner diameter of the casing. As a result, the entire control cable, with fittings attached, can be pulled through the casing to remove the control cable for inspection, maintenance or replacement. This simplifies maintenance, and substantially increases the service life of the cable assembly. To facilitate connection to control levers, pedals or the like, or to apparatus to be controlled or operated, couplings or other connecting members may be detachably secured to the fittings by renewable connections such as threaded joints, for example, that allow the couplings to be removed and replaced easily.

The invention also provides a unique combination of ball joint assemblies and excluder seals that effectively exclude contaminants from the interior of the casing, which also helps to increase service life. These and other features of the inventive cable are described more thoroughly in the following detailed description.

DRAWINGS

FIG. 2 is a cross-sectional view along lines 2—2 in FIG. 1.

FIG. 3 is an enlarged cross-sectional view of a ball joint assembly in the control cable assembly illustrated in FIGS. 1 and 2.

FIG. 4 is a further enlarged cross-sectional view of an excluder seal in the control cable assembly of FIGS. 1 and 2.

FIG. 5 is an end view of the excluder seal in FIG. 4, partially cut away to show parts of the excluder seal in more detail.

DETAILED DESCRIPTION

Figure 1:
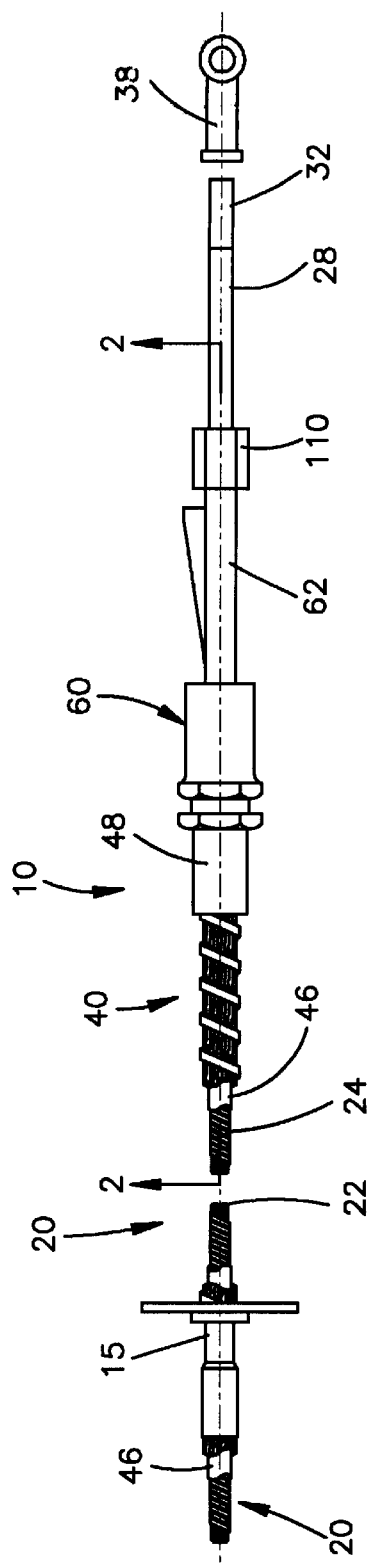
FIG. 1 is a fragmentary, partially cutaway plan view of a control cable assembly embodying this invention.
Figure 1:
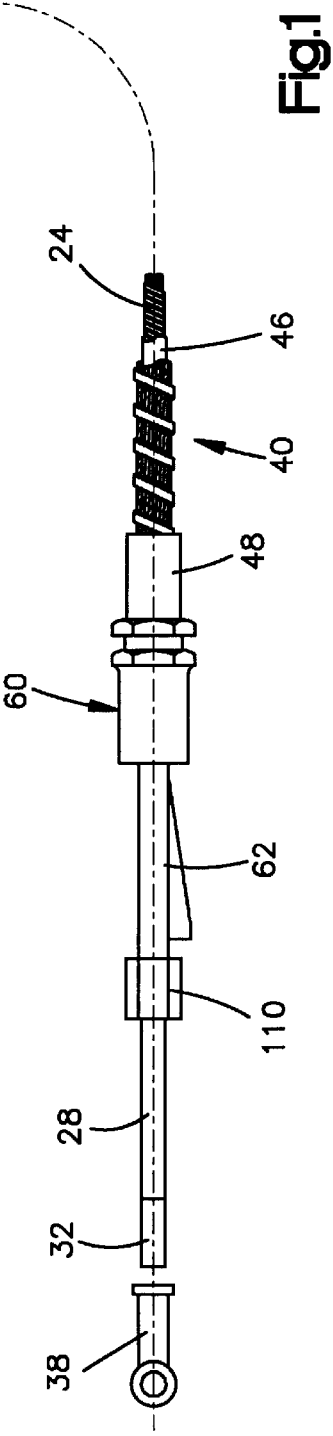

FIG. 1 illustrates a control cable assembly, generally referred to as 10, embodying this invention. Cable assembly 10 may extend from the cockpit of an aircraft, or another operating area, to an engine compartment or other remote or hostile location. The cable assembly has a control cable 20 adapted for reciprocation within a casing 40. Casing 40 typically extends through a bulkhead fitting 15 in a wall or other partition between the aircraft cockpit, or other operating area, and the compartment where the engine or other system to be controlled is located.

Each end of control cable 20 has an end rod 28 with a threaded end 32 for attaching a connecting member, such as the couplings 38 illustrated in FIG. 1, that attach the end rods 28 to control levers, pedals or the like in an aircraft cabin or other operating compartment, or to an engine or other system to be controlled. The diameter of the end rods 28 is less than the inner diameter of the casing 40. This allows the control cable 20, with end rods attached, to be pulled through the casing 40 and removed for inspection, repair or replacement when a coupling 38 has been removed from one of the end rods. In most cases, both ends of the control cable 20 are substantially the same. Thus, the cable can normally be removed in either direction. However, there may be modifications for particular applications, such as differences in the threads on the end rods.

The ability to remove control cable 20 from casing 40 permits servicing, maintenance and repairs that were not possible with prior art control cable assemblies, whose central cables could not be removed without removing end fittings that were permanently attached to this control cable by swaging or the like. This is not a problem with the control cables of this invention, however, because the end rods that are permanently attached to the cables can pulled through the casing. Typically, couplings 38 or other connecting members, designed for connections with engines or other systems to be operated or controlled, or to control levers, pedals or the like, are attached to the end rods with threaded or other renewable connections that allow the connecting members to be removed without distorting or damaging either the end rods or the connecting members. Thus, the control cable can be removed from the casing and the connecting members can be replaced or reinstalled when the control cable has been reinstalled or replaced. The ability to remove and reinstall or replace the control cable in this manner reduces the cost of maintaining and repairing the cable assembly 10, and tends to increase its useable life.

The central part of control cable 20 is similar to prior control systems of this sort. It consists of a flexible core 22 of stranded wire covered with an armor construction or cover formed by steel flats 24 wrapped around the stranded wire core 22. The steel flats protect the stranded wire core from wear, crushing and the like, and support the core if it is placed in compression. As best seen in FIG. 2, the armor is peeled from or left off the end of the core, which is inserted into a cylindrical bore 34 in end rod 28. The thin cylindrical shell 36 that surrounds bore 34 is then mechanically swaged or compressed to clamp end rod 28 to the bare core 22 on the end of the flexible cable with sufficient compression to maintain a secure connection between the end rod 28 and core 22 when the cable 20 is placed in tension.

The central part of casing 40 is also similar to prior control cable assemblies. A stranded wire conduit 42 is wrapped with steel flats 44 that are similar to the flats 24 that form the armor cover on the core 22. The stranded wire conduit 42 is lined with a polytetrafluoroethylene tube 46 that reduces friction on the control cable 20.

As shown in FIG. 2, casing 40 extends into cylindrical bores 52 in casing caps 48, and the thin annular shells 54 that surround the cylindrical bores 52 are mechanically swaged to lock the casing caps securely on the casing assembly. Like the swaged connection between the end rod and the central core 22, this connection provides a robust, dependable connection. The joints between the casing assembly 40 and the casing caps 48 are sealed with a watertight, two piece epoxy sealant to exclude foreign material at these joints.

The ends of the cable 20 extend through support tubes 62, mounted in ball joint housings 74 threaded onto casing caps 48. As best seen in FIG. 2, the joints between the end rods 28 and cable 20 are preferably located in the central portions of the support tubes 62. The end rods extend through excluder seal assemblies 110, described in more detail below, attached to the outer ends of the support tubes. The control cables 20 extend through casing caps 48 into enlarged, substantially spherical knobs 66 at the inner ends of the support tubes 62. These knobs 66 are enclosed within generally cylindrical ball joint housings 74 that allow the end rods to pivot through at an angle of at least 5° in any direction from the illustrated central position. In other words, the end rod can swivel within a cone having a central angle of 10° or more. As shown in FIG. 3, an inwardly extending shoulder 76 on each housing defines a hole 78 which is slightly larger than the section of the support tube extending through this hole. This allows the support tube and end rod to pivot within the specified limits, but prevents excessive movement which could damage the flexible core within the ball joint. As best seen in FIG. 3, the ends of control cable 20 enter the enlarged knobs on the support tubes through conical bores 68, which typically have a cone angle roughly equal to the angle of the cone within which the support tubes can pivot. The sides of these conical bores help to support the control cable when the end rods pivot.

As also shown in FIG. 3, the enlarged knobs 66 at the inner ends of the support tubes are sealed within ball joint housings 74 by pairs of polytetrafluoroethylene seals 92, 96. Springs 82, held in place by retaining rings 84 mounted in grooves in the inner walls of the housings, press seals 92 against the spherical ends 66 of the support tubes. The spherical ends of the support tubes press against seals 96, which are held in place by the inwardly extending shoulders 76 on the end of the housings 74. Seals 92 and 96 protect the cable assembly from contamination along the surface of the of the support tubes 62. O-rings 94, 98 at the outer corners of seals 92 and 96 seal against the inner walls of the ball joint housings 74 and minimize the potential for contamination at these points.

As mentioned above, each end rod 28 extends through an excluder seal assembly 110, shown in FIGS. 4 and 5. The excluder seal assembly 110 has a U-cup rod seal 114, commercially available from Shamban Seals, mounted in a nose cap 112 treaded onto the outer end of support tube 62. Rod seal 114 is energized by a spring 116 which presses against the end of the support tube. The compressed spring 116 presses the U-cup rod seal against end rod 28, providing a dependable seal at this juncture.

The excluder seal assembly also incorporates a pair of knife-like conical brass wiper rings 122, 132, shown in FIGS. 4 and 5 and commercially available from Wynn's Precision, Inc, Houston, Tex., which act as blades to remove and dispose of foreign matter on the end rod 28, thereby protecting the U-cup rod seals. Each of these rings has a flange 124, 134 at its base or inner end. The wiper rings are held in place by a cushion ring 138 of an elastomeric materials such as nitrile, butyl, fluoroelastomers or PTFE. As shown in FIG. 5, each of the wiper rings 122, 132 has a pair of slits or notches 126, 136, spaced 180° degrees apart in the conical wall and oriented so that the slits 126 in the inner wiper ring 122 are not aligned with the slits 136 in the outer wiper ring seal. These slits provide flexibility, allow for expansion, and produce a spring effect resulting in constant contact with the end rod 28, full circle. When compressed, cushion ring 128 preloads the wiper rings for wiper edge contact with the end rods 28, and absorb shock and side loads. The seal is self adjusting. The wiper rings lengthen the life of the U-cup seals by keeping foreign material from damaging the lips of the U-cup seals, and provide a secondary seal that further reduces the risk of contamination.

The combination of the PTFE/O-ring seals in the ball joint assembly 60 and the spring energized U-cup rod seals and wiper rings in the excluder seal assembly 110 provide increased and dependable protection against contamination from foreign materials entering the cable, thus increasing the anticipated life of the cable assembly. As those skilled in the art will readily appreciate, the removable core assemblies of these inventive cables also facilitate servicing, maintenance and repairs, which increases the anticipated service life still further. Of course, as those skilled in the art will also appreciate, the control cable assembly shown and described herein is merely illustrative. Many modifications to and adaptations of the illustrated assembly may be made within the scope of this invention, which is defined by the following claims.

What is claimed is:

1. A reciprocating control cable assembly comprising:

a flexible casing with at least one support tube attached to an end of said flexible casing;

a control cable, comprising a flexible core and an armor wrap, mounted within and adapted for reciprocation within said flexible casing, said cable having a first end extending from a first end of said flexible casing, and having a second end extending from a second end of said flexible casing, at least one of said ends extending from said flexible casing into said support tube;

a first fitting attached to said first end of said cable and a second fitting attached to said second end of said cable, at least one of said fittings being permanently attached to an end of said control cable within one of said support tubes and extending beyond said support tube, said permanently attached fitting having a projected width no greater than the inner diameter of said flexible casing, whereby said permanently attached fitting can be pulled through said casing and out of the other end of said casing to remove said control cable for examination, repair or replacement;

said permanently attached fitting comprising a rod having an outer diameter substantially equal to the outer diameter of said armor wrap and an axial bore in an end of said rod, said bore having a diameter substantially equal to the outer diameter of said flexible core and defining an annular shell surrounding said axial bore, with an end of said flexible core extending into said axial bore, and said annular shell being swaged to attach said fitting to said cable;

a connecting member connected to said permanently attached fitting by a renewable connection outside said support tube; and at least one seal assembly comprising a hollow tube having an enlarged end, and a seal member biased against said enlarged end.

2. A reciprocating control cable assembly comprising:

a flexible casing, with at least one support tube attached to an end of said flexible casing;

a control cable comprising a flexible core and an armor wrap mounted within and adapted for reciprocation within said flexible casing, said cable having a first end extending from a first end of said flexible casing, and having a second end extending from a second end of said flexible casing, at least one of said ends extending from said flexible casing into said support tube;

a first fitting attached to said first end of said cable and a second fitting attached to said second end of said cable, at least one of said fittings being permanently attached to an end of said control cable within one of said support tubes and extending beyond said support tube, said permanently attached fitting having a projected width no greater than the inner diameter of said flexible casing, whereby said permanently attached fitting can be pulled through said casing and out of the other end of said casing to remove said control cable for examination, repair or replacement;

said permanently attached fitting comprising a rod having an outer diameter substantially equal to the outer diameter of said armor wrap and an axial bore in an end of said rod, said bore having a diameter substantially equal to the outer diameter of said flexible core and defining an annular shell surrounding said axial bore, with an end of said flexible core extending into said axial bore, and said annular shell being swaged to attach said fitting to said cable;

a connecting member connected to said permanently attached fitting by a renewable connection outside said support tube; and at least one seal assembly comprising a hollow tube having an enlarged end, and a seal member biased against said enlarged end;

wherein said core extends into said support tube and said seal assembly allows said core to pivot through an arc of at least 10° in any direction from its neutral axis.

* * * * *